United States Patent [19]

Müller et al.

[11] Patent Number: 4,576,526

[45] Date of Patent: Mar. 18, 1986

[54] ARRANGEMENT FOR SUPPLYING POWDERED MATERIAL TO A SPRAYING DEVICE

[75] Inventors: Niklaus Müller, Rosenau, France; Daniel Audemars, Echandens, Switzerland

[73] Assignee: Castolin S.A., Saint-Sulpice, Switzerland

[21] Appl. No.: 693,220

[22] Filed: Jan. 18, 1985

Related U.S. Application Data

[63] Continuation of Ser. No. 361,890, Mar. 25, 1982, abandoned.

[30] Foreign Application Priority Data

Apr. 1, 1981 [CH] Switzerland ........................ 2216/81

[51] Int. Cl.⁴ ............................................ B65G 53/40

[52] U.S. Cl. ........................................ 406/75; 222/56; 198/762

[58] Field of Search ...................... 406/75; 222/56, 61, 222/63, 64, 196, 77, 58; 198/524, 761, 762, 347, 751

[56] References Cited

U.S. PATENT DOCUMENTS

| | | | |
|---|---|---|---|
| 2,376,791 | 5/1945 | Lindsay | 198/762 |
| 2,407,357 | 9/1946 | Weyandt | 198/762 |
| 2,568,332 | 9/1951 | Genovese | 222/56 X |
| 3,110,420 | 11/1963 | Brewer | 222/56 |
| 3,225,963 | 12/1965 | Arpajian | 227/56 X |
| 4,159,150 | 6/1979 | Rachais | 406/75 X |
| 4,346,818 | 8/1982 | Bosmiller | 222/77 X |
| 4,381,898 | 5/1983 | Rotolico et al. | 406/14 X |

*Primary Examiner*—Jeffrey V. Nase
*Assistant Examiner*—L. E. Williams
*Attorney, Agent, or Firm*—Hopgood, Calimafde, Kalil, Blaustein & Judlowe

[57] ABSTRACT

An arrangement for supplying powdered material to a spraying device in an installation for thermal spraying comprises at least one powder storage container and an injection device by which the powder is introduced into a stream of carrier gas. A buffer chamber is disposed upstream of the injection device and comprises means for controlling the level of the powder, at least one controllable feeding means being connected, by means of a control device, to the level-controlled buffer chamber.

The present arrangement allows to obtain a well-defined rate of flow of powder which is constant and adjustable, from one or more powder storage containers.

5 Claims, 3 Drawing Figures

ARRANGEMENT FOR SUPPLYING POWDERED MATERIAL TO A SPRAYING DEVICE

Figure 1:
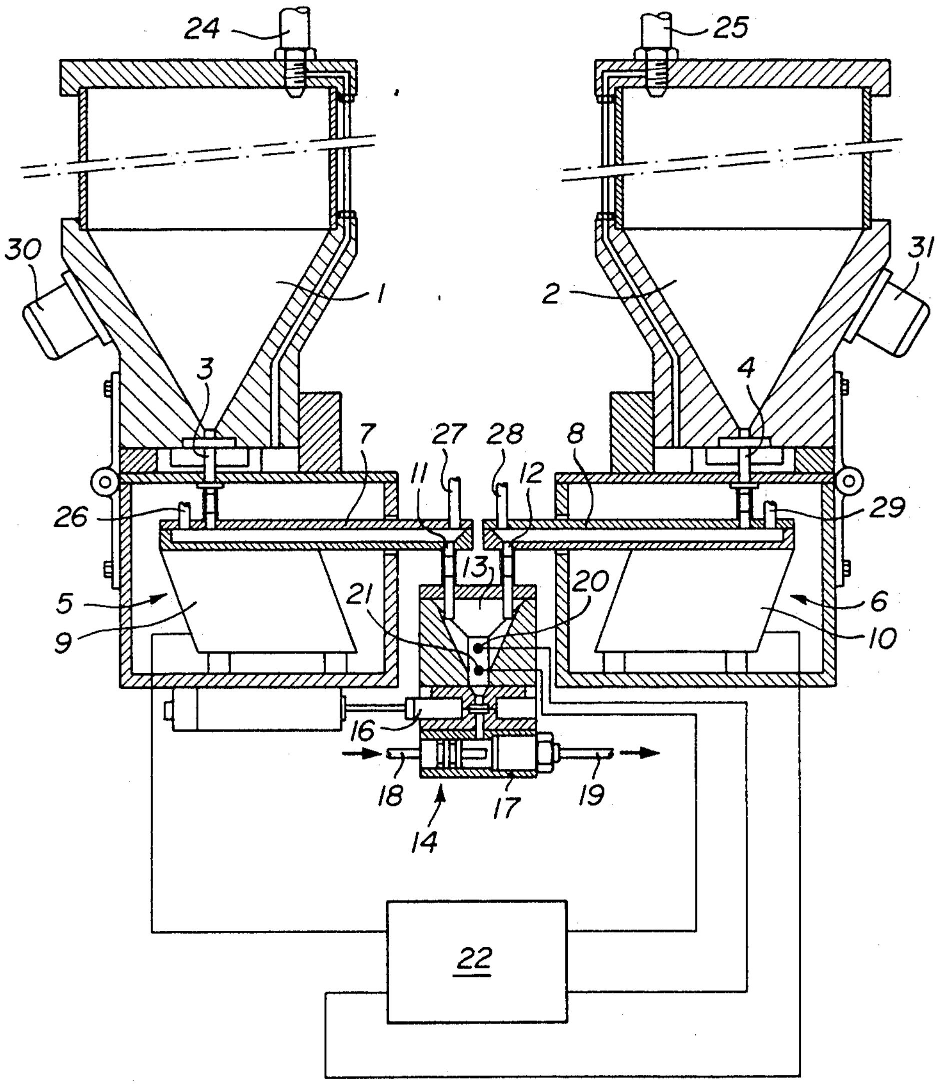

This application is a continuation of application Ser. No. 361,890, filed Mar. 25, 1982, now abandoned.

The present invention relates to an arrangement for supplying materials in powder form to a spraying device in an installation for thermal spraying, comprising at least one powder storage container and at least one injection device, in which the powder to be sprayed is introduced into a stream of carrier gas.

In an installation for the thermal spraying of materials in powder form, such as, for example, metal or ceramic powders or powders of organic or vitreous materials, to produce a protective layer on a surface or to produce an object by spraying, the quality thereof is very largely dependent on the precision and the constancy of the flow of powder supplied to the spraying device.

Various arrangements are already known which comprise members for defining in a regulatable manner, the rate of flow of powder in such an installation. Nevertheless, it is not possible with these known arrangements to control the effective rate of flow during operation and to assure the desired constancy in the powder supply from one or more powder storage containers.

It is the main object of the invention to provide a powder supply arrangement of the aforementioned type, with which it is possible to obtain a well defined, constant and adjustable rate of flow of powder from one or more powder storage containers. In the case of several containers, the invention has for object to provide means for separate control of the flow rates from each container and/or of the total rate of flow.

To this end, the powder supply arrangement according to the invention comprises at least one buffer chamber for the flow of powder, situated up-stream the injection device and equipped with means for controlling the level of powder in this chamber, at least one controllable powder supply device for the said buffer chamber, disposed following the powder storage container and supplied, in its turn, by this latter, and also a control device connected, by an inlet, to the means for controlling the level of powder in the buffer chamber and, by a control outlet, to the supply device for regulating the delivery of this latter, so as to keep the powder level in the buffer chamber approximately constant and thus to achieve a constant rate of flow of powder to the outlet of the supply arrangement.

The invention also has for its object an installation for thermal spraying comprising at least two supply arrangements, such as that specified above.

According to one preferred embodiment of the supply arrangement according to the invention, the buffer chamber comprises an essentially frustoconical part which is open upwardly and at least two level-detecting devices which are adapted to permit the detection of the presence of powder at respectively a minimum level and at a maximum level.

The supply arrangement may comprise a vibrating slide or channel which is arranged substantially horizontally and is provided at one of its ends with a supply orifice connected to a powder storage container and, at its other end, with an outlet orifice connected to the buffer chamber, the slide or channel being mechanically coupled to a vibrator designed so as to cause vibration of the slide, at least in the longitudinal direction with an amplitude and/or a frequency which are adjustable, under the control of the control device.

The supply arrangement according to the invention preferably comprises at least two assemblies, each having a powder storage container and a controllable powder supply device, these assemblies supplying a common buffer chamber and a common injection device, a common control device being arranged for regulating the delivery of the supply devices, separately and/or together.

Moreover, the arrangement according to the invention may comprise at least one force sensing device, this latter and at least one assembly comprising one or more powder storage containers and, if necessary, one or more of the said supply devices being arranged and coupled in such a manner that the sensing device is subjected to the weight of the assembly, this sensing device being connected to the control device and/or to a display and/or recording device for supplying to the said devices a signal which comprises the data concerning the decrease in weight of the assembly during operation.

One embodiment and forms of application of the arrangement according to the invention are shown by way of example in the accompanying drawing.

Figure 2:
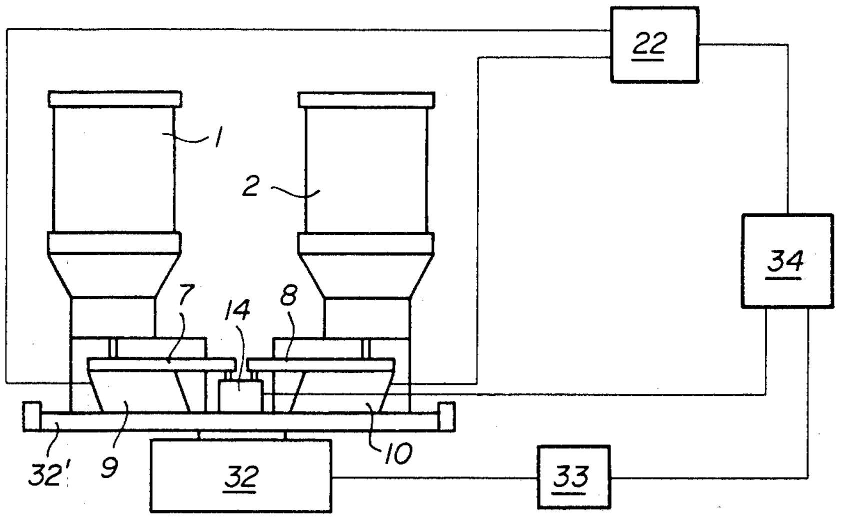
Figure 3:
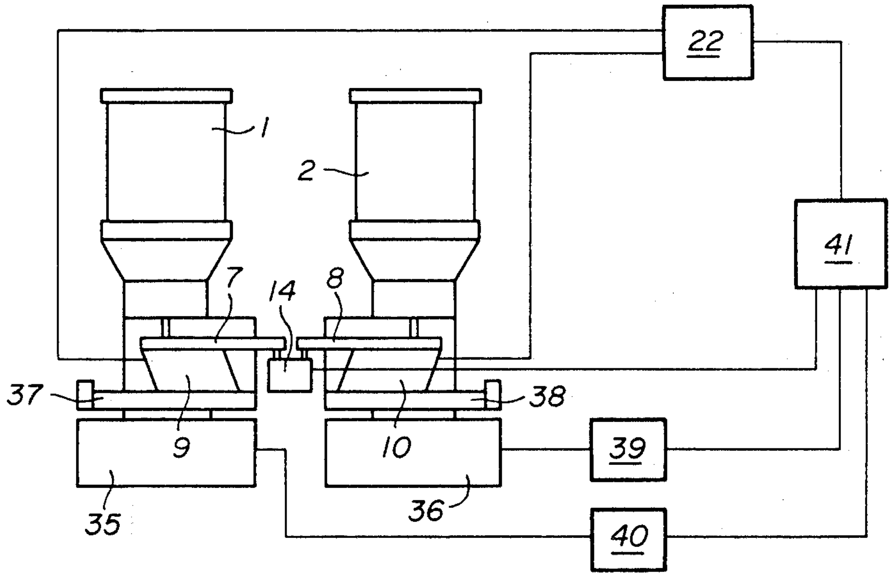

FIG. 1 is a diagrammatic view of a powder supply arrangement according to the invention, and FIGS. 2 and 3 are diagrams which illustrate two particular forms of application of this arrangement.

The arrangement which is shown in FIG. 1 comprises two powder storage containers 1 and 2, of which the respective outlet orifices 3 and 4 are respectively connected to supply devices 5 and 6. In the present case, these supply devices are constructed in the form of vibrating slides 7, 8 having a channel, for example, of trapezoidal section, each slide being coupled mechanically to a corresponding vibrator 9, 10. Outlet orifices 11, 12 of these supply devices are connected to a buffer chamber 13, which forms part of a supply unit represented as a whole by the reference 14. The unit 14 comprises a transfer duct 15, the flow section of which is determined by a selector member 16 and which connects the buffer chamber 13 to an injection device 17. The injection device 17 is connected to an inlet pipe 18 for carrier gas and to an outlet pipe 19 supplying a mixture consisting of powder to be sprayed and carrier gas.

The buffer chamber for the flow of powder 13 has an essentially frustoconical form and has two level detectors disposed at different heights in the wall of its lower portion. These level detectors can be a conventional type, for example, photoelectric, and are connected to a control device which is represented diagrammatically by the block 22 in FIG. 1. The dectector 20 thus supplies to this control device a signal indicating the presence of powder at an upper level, for example, the maximum tolerated level, and the detector 21 supplies to the control means a signal relative to the presence or absence of powder at a lower level, which is the minimum tolerated level in the buffer chamber. The control device 22 comprises two control outlets which are respectively connected to the vibrators 9 and 10 of the supply devices.

FIG. 1 shows diagrammatically the frame 23 of the supply arrangement and inlet pipes 24, 25 for inert protective gas, such as argon, which fills the free volume of the containers 1 and 2, the powder duct of the supply device 7, 8, by way of connections represented diagrammatically at 26, 27, 28 and 29, and also the buffer chamber 13. The containers 1 and 2, which are removable and are equipped with an automatic shut-off device for their outlet opening in the event of separation, comprise in addition conventional vibrating or hammering devices 30, 31. On the other hand, the buffer chamber is preferably also subject to the action of a vibrator (not shown in FIG. 1) for assisting the flow of the powder at this position. The selector device 16 preferably comprises an actuator acting on a diaphragm or on a disc or plate having several openings of different sizes, permitting the flow section of the duct 15 to be chosen.

The operation of the arrangement in FIG. 1 is as follows.

The mean rate of flow of powder is first of all established, as regards the flow of powder in the injection device 17, by means of the selector device 16. The supply to the injection device from powder storage container, such as 1, is effected by means of the controllable powder supply device, such as 7, and the buffer chamber. When the level of the powder in the buffer chamber 13 is constant, the flow of powder into the injector is likewise constant, and this corresponds to the condition to be achieved. The level-detection devices 20 and 21 detect any variation in level of the powder in the buffer chamber within the upper and lower level limits defined by the positioning thereof. The control device 22, which controls or directly supplies the vibrators 9 and 10, is designed, in a manner which is appropriate and well known to those skilled in the art, for varying the amplitude and/or the frequency of the vibrations which assure the supply to or feeding of the buffer chamber in such a manner that the level of powder in the letter remains between the extreme limits which have been referred to. The result is the formation of a regulating or control loop comprising the vibrating slide, the buffer chamber, the level-detecting devices in this chamber and the means for controlling the vibrators actuating the vibrating supply slide or channel.

Two or more devices are capable of supplying a single buffer chamber, as is shown in FIG. 1 by the devices 7, 8. The control device 22 in this case is preferably designed for the individual control of each vibrator, such as 9, 10, in a definite manner with respect to the other vibrators. In particular, this makes it possible to achieve a mixture of different powders in a required ratio, the overall rate of flow remaining constant, on account of the level detection in the buffer chamber and the aforementioned regulation.

The vibrators of hammers associated with the powder storage container and the buffer chamber assure the satisfactory functioning of the arrangement, it being possible for the vibrator associated with the buffer chamber also to serve for regulating the rate of powder flow through the duct 15 and thus to satisfy the function of the selector 16.

Two embodiments of the arrangement according to the invention are shown diagrammatically in FIGS. 2 and 3, in which one or more force sensing devices are used in association with the control device.

In FIG. 2, the assembly formed by the containers 1, 2, the feeding means 7, 8 and the supply unit 14, as well as the connecting members between these different parts, are disposed in a manner for actuating a force sensing device 32. This is symbolised in FIG. 2 by the plate 32' positioned above the sensing device 32. The signal supplied by this force sensing device contains datum as regards the rate of flow of the powder supplied by the aforementioned assembly and this datum is preferably displayed or recorded in a device which is represented by the block 33. On the other hand, this datum or information can be dealt with in a device which is represented by the block 34, or it may likewise be combined with the information coming from the level-detection device of the block 14.

In FIG. 3, the assemblies associated with a force sensing device, such as 35 or 36, respectively comprise the powder storage containers 1, 2, the respective feeding means 7, 8, and the means of connection between these parts, each assembly being designed for actuating the corresponding force sensing device, this being symbolised by the respective plates 37, 38. In this case, the force sensing devices 35, 36 supply to the respective display and/or recording devices 39, 40, and also to a data-processing unit 41, the data which are concerned with the rate of flow of powder separately from each container 1, 2. This information is preferably combined in the unit 41 with that which originates from the supply unit 14, such as that which is indicated diagrammatically in FIG. 3. In the two cases of FIGS. 2 and 3, the control device is operative in appropriate manner on the vibrators which actuate the supply means 7, 8.

It is thus possible accurately to determine the rate of flow of powder supplied to an injection device from one or more powder storage containers, to keep the overall rate of flow strictly constant at a predetermined value and, if necessary, to determine the rate of flow of powder supplied from each container, separately or in a required ratio with that of the other containers.

On the other hand, in accordance with one form of application of the present arrangement, two or more supply arrangements are connected in parallel or in series with each other and to a powder-transporting conduit supplying a thermal spraying device, this making possible the use of complex powder mixtures or the obtaining of a continuity of the spraying operation after the emptying of a powder store in one of the containers.

We claim:

1. A powder transport system for supplying powdered material to a flame spray device for thermal spraying which comprises,
   - at least two powder storage containers,
     - each having an exit orifice for delivering powder therefrom,
   - at least two powder feed means each comprising a substantially horizontally disposed elongated enclosed channel member, each having means for supplying inert protective gas therethrough,
   - each coupled at one end to the exit orifice of a corresponding storage container for receiving powder therefrom,
     - each of said enclosed channel members having an exit port at its other end coupled to a single buffer chamber of a substantially frustonconical shape which opens upwardly,
     - each of said enclosed channel members being adapted to vibrate along its length to effect powder delivery to said buffer chamber,
   - vibrating means mechanically coupled to each of said enclosed channel members for adjustably controlling the vibration along the length of each of said enclosed channel members,
   - level-detecting means disposed within said buffer chamber adapted to provide a level range over which the depth of said powder in said chamber is to be controlled, an exit orifice at the bottom of said buffer chamber, a powder-injection device having a transfer duct for receiving said powder coupled to said chamber exit orifice and a selector device cooperating therewith for varying the flow of powder between the buffer chamber and the injection device, said injection device having an inlet end for receiving carrier gas and an outlet end for delivering powder suspended in said carrier gas to a flame spray device, and a control device coupled to each of the vibrating means and responsive to the level-detecting device in the buffer chamber for regulating powder feed to said buffer chamber via said vibrating means either together or separately, whereby to maintain the powder level in the buffer chamber at the desired level and thus achieve substantially constant rate of powder flow to said flame spray device.

2. The powder transport system as in claim 1, including means for supplying inert gas to each of the powder storage containers, and the buffer chamber.

3. The powder transport system as in claim 1, including at least one force-sensing device cooperably associated with at least one assembly comprising said powder storage container and said controllable powder feed means and adapted in such a manner that the sensing device is responsive to the weight of the assembly and thus provide a signal corresponding to the change in weight of the assembly during operation, the information corresponding to said signal being conveyed by said weight-sensing device to said control device, and/or a display device therefor, and/or a recording device.

4. The powder transport system of claim 3, wherein said assembly also includes said buffer chamber.

5. The powder transport system of claim 1, including at least one force-sensing device, wherein said force-sensing device is cooperably associated with at least one assembly comprising at least two powder storage containers, each with said controllable powder feed means and a buffer chamber, said association being such that the force-sensing device is responsive to the weight of said assembly and provides a signal corresponding to the change of weight thereof during operation, the force-sensing device being connected to said control device and/or a display device therefor, and/or a recording device for conveying said signal thereto.

* * * * *